US009582789B2

(12) United States Patent
Green et al.

(10) Patent No.: US 9,582,789 B2
(45) Date of Patent: Feb. 28, 2017

(54) PAYMENTS IN COMMUNICATION SYSTEMS

(71) Applicant: GOOGLE INC., Mountain View, CA (US)

(72) Inventors: Travis Harrison Kroll Green, Washington, DC (US); Michael DePasquale, Paris (FR); Boris Mizhen, Brooklyn, NY (US); Josh Ostrow, New Rochelle, NY (US); Peter Schmitt, Jersey City, NJ (US); Kevin Michael Bierhoff, Brooklyn, NY (US); Alevtina Stolpnik, New York, NY (US); Avery Pennarun, New York, NY (US); Narelle Cozens, New York, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/896,253

(22) Filed: May 16, 2013

(65) Prior Publication Data

US 2014/0279457 A1    Sep. 18, 2014

Related U.S. Application Data

(60) Provisional application No. 61/801,277, filed on Mar. 15, 2013.

(51) Int. Cl.
*G06Q 40/00* (2012.01)
*G06Q 20/10* (2012.01)

(52) U.S. Cl.
CPC ........... *G06Q 20/102* (2013.01); *G06Q 20/10* (2013.01); *G06Q 20/108* (2013.01); *G06Q 40/00* (2013.01)

(58) Field of Classification Search
CPC ........ G06Q 20/10; G06Q 40/02; G06Q 20/04; G06Q 40/00; G06Q 20/108
(Continued)

(56) References Cited

U.S. PATENT DOCUMENTS 6,704,039 B2 *   3/2004   Pena .......................... 348/14.01
7,043,459 B2 *   5/2006   Peevey ........................ 705/412
(Continued)

FOREIGN PATENT DOCUMENTS

JP      2004-272470 A      9/2004
JP      2007-226794 A      9/2007
(Continued)

OTHER PUBLICATIONS

Park, "International Search Report and Written Opinion issued in International Application No. PCT/US2014024812", Jul. 24, 2014, 1-13.
(Continued)

*Primary Examiner* — Kelly Campen
(74) *Attorney, Agent, or Firm* — Johnson, Marcou & Isaacs, LLC

(57) ABSTRACT

Users of a communication system can initiate electronic payments during a communication session hosted by the communication system or via a social network identity page hosted by the communication system. The communication system detects a payment signal from a user of the communication system and the collects payment information details either by displaying a payment object interface in a communication application of the user or receiving payment information input directly from the user's communication device. The payment information includes sender and recipient payment account identifiers that are communicated to a payment processing system for processing and delivery of the designated payment amount to the recipient.

21 Claims, 6 Drawing Sheets

(58) Field of Classification Search
USPC .............................. 705/40, 319, 35, 36 R, 39
See application file for complete search history.

(56) References Cited

U.S. PATENT DOCUMENTS

| | | | |
|---|---|---|---|
| 7,720,756 B2* | 5/2010 | Kavounas ...................... 705/39 |
| 7,950,575 B2* | 5/2011 | Stoutenburg et al. ........ 235/379 |
| 8,396,808 B2* | 3/2013 | Greenspan ..................... 705/64 |
| 8,443,198 B2* | 5/2013 | Ginter et al. ................. 713/182 |
| 8,573,486 B2* | 11/2013 | McKelvey et al. ........... 235/380 |
| 2001/0049639 A1* | 12/2001 | Sapin-Lignieres ............. 705/26 |
| 2002/0024590 A1* | 2/2002 | Pena ......................... 348/14.08 |
| 2002/0091653 A1* | 7/2002 | Peevey ........................ 705/412 |
| 2002/0198769 A1* | 12/2002 | Ratcliff, III .................... 705/14 |
| 2003/0050896 A1* | 3/2003 | Wiederin ........................ 705/64 |
| 2004/0169722 A1* | 9/2004 | Pena ......................... 348/14.01 |
| 2005/0273448 A1* | 12/2005 | Ratcliff, III .................... 706/13 |
| 2007/0027803 A1* | 2/2007 | Brandes et al. ................ 705/39 |
| 2007/0156579 A1* | 7/2007 | Manesh .......................... 705/39 |
| 2008/0011825 A1* | 1/2008 | Giordano et al. ............. 235/380 |
| 2010/0179908 A1* | 7/2010 | Stoutenburg et al. .......... 705/44 |
| 2010/0262544 A1 | 10/2010 | Levchin et al. |
| 2010/0325698 A1* | 12/2010 | Ginter et al. ..................... 726/4 |
| 2011/0029416 A1* | 2/2011 | Greenspan ..................... 705/30 |
| 2011/0153498 A1* | 6/2011 | Makhotin et al. .............. 705/44 |
| 2012/0095857 A1* | 4/2012 | McKelvey et al. ............. 705/17 |
| 2012/0143761 A1 | 6/2012 | Doran et al. |
| 2012/0185316 A1 | 7/2012 | O'Leary et al. |
| 2012/0233066 A1 | 9/2012 | Vallabhaneni |
| 2012/0271763 A1* | 10/2012 | Toms et al. ...................... 705/41 |
| 2013/0085939 A1* | 4/2013 | Colak et al. ..................... 705/44 |
| 2013/0138562 A1* | 5/2013 | Yoo ................................. 705/44 |
| 2013/0166086 A1* | 6/2013 | Rugolo ......................... 700/295 |
| 2013/0226798 A1* | 8/2013 | Orttung et al. ................. 705/44 |

FOREIGN PATENT DOCUMENTS

| | | |
|---|---|---|
| JP | 2009-116628 A | 5/2009 |
| JP | 2012-185672 A | 9/2012 |
| KR | 10-20100035684 A | 4/2010 |
| KR | 1020120108792 A1 | 10/2012 |
| WO | 2009/032216 A1 | 3/2009 |
| WO | 2014/151039 A1 | 9/2014 |

OTHER PUBLICATIONS

Nakamura, "International Preliminary Report on Patentability issued in International Application No. PCT/US2014/024812", mailed on Sep. 24, 2015, 9 pages.

Hasubek, "Extended European Search Report issued in European Application No. 14770259.1", mailed on Jul. 7, 2016, 8 pages.

Lee, "Korean Office Action issued in Korean Application No. 10-2015-7028319", mailed on Oct. 6, 2016, 7 pages of English Translation and 7 pages of Korean Office Action.

Tsukino, "Japanese Office Action issued in Japanese Application No. 2016-501648", mailed on Dec. 5, 2016, 4 pages of English Translation and 3 pages of Japanese Office Action.

* cited by examiner

200

205
Synchronous communication session initiated between two or more remote client devices via a communication system 210
Payment module detects a sender's intent to send a payment 215
Collect payment transaction information from the sender 220
Payment module communicates payment request comprising payment transaction details to a payment processing system 225
Payment processing system processes the payment request 230
Payment module receives payment confirmation from payment processing system 235
Payment module records payment transaction in a payment transaction log 240
Payment module communicates a payment confirmation to the recipient and the sender

Figure 2

PAYMENTS IN COMMUNICATION SYSTEMS

RELATED APPLICATIONS

This application claims priority to U.S. Provisional Patent Application No. 61/801,277 filed Mar. 15, 2013 and entitled "Payments in Communication Systems." The entire contents of the above-identified application are hereby fully incorporated herein by reference.

TECHNICAL FIELD

The present disclosure relates to systems and methods for conducting electronic peer-to-peer payments. More particularly, the present disclosure provides systems and methods for initiating and completing electronic payments using synchronous communication systems.

BACKGROUND

When communicating using synchronous communication systems, such as instant messaging and videoconference, users often discuss details related to payments, including money owed to one another. Ideally, such a discussion during a synchronous communication session would not be interrupted in order to complete a payment. In conventional communication systems, payments can be made only by interrupting the conversation to open a separate browser window to access a payment service and then optionally to use a screen-sharing function to confirm that payment details are correct. Each of these actions interrupts the conversation and moves the focus away from the discussion at hand. Likewise, users are often reminded of money they owe to other individuals when reviewing their own social networking news feeds or viewing the social network identity pages of their contacts within their social network. Currently, a way to initiate an electronic payment during a synchronous communication session or directly from another users social network identity page does not exist.

SUMMARY

In certain example embodiments described herein, a method to send electronic payments via communication systems comprises initiating a communication session between two remote computing devices over a synchronous communication network, detecting a payment option signal from one of the remote computing devices indicating the intent of a user to send an electronic payment to another user participating in the communication session, displaying a payment information object in a communication application of the user sending the payment, receiving payment information entered by the sender at the payment information object, and communicating the received payment information to a payment processing system for processing of the payment and delivery of the payment amount to a payment account of the recipient.

In certain other example embodiments described herein, a method to send electronic payments via a recipient's social network identity page comprises detecting selection by a user of a payment object interface displayed on a recipient's social network identity page, displaying a payment information object interface to the user on the recipient's social network identity page, receiving payment information from the user entered at the payment object interface, and communicating the received payment information to a payment processing system for processing of the payment and delivery of the payment amount to a payment account of the recipient.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 2 is a block flow diagram depicting a method to send electronic payments via communication systems, in accordance with certain example embodiments.

DETAILED DESCRIPTION OF EXAMPLE EMBODIMENTS

Overview

Figure 1:
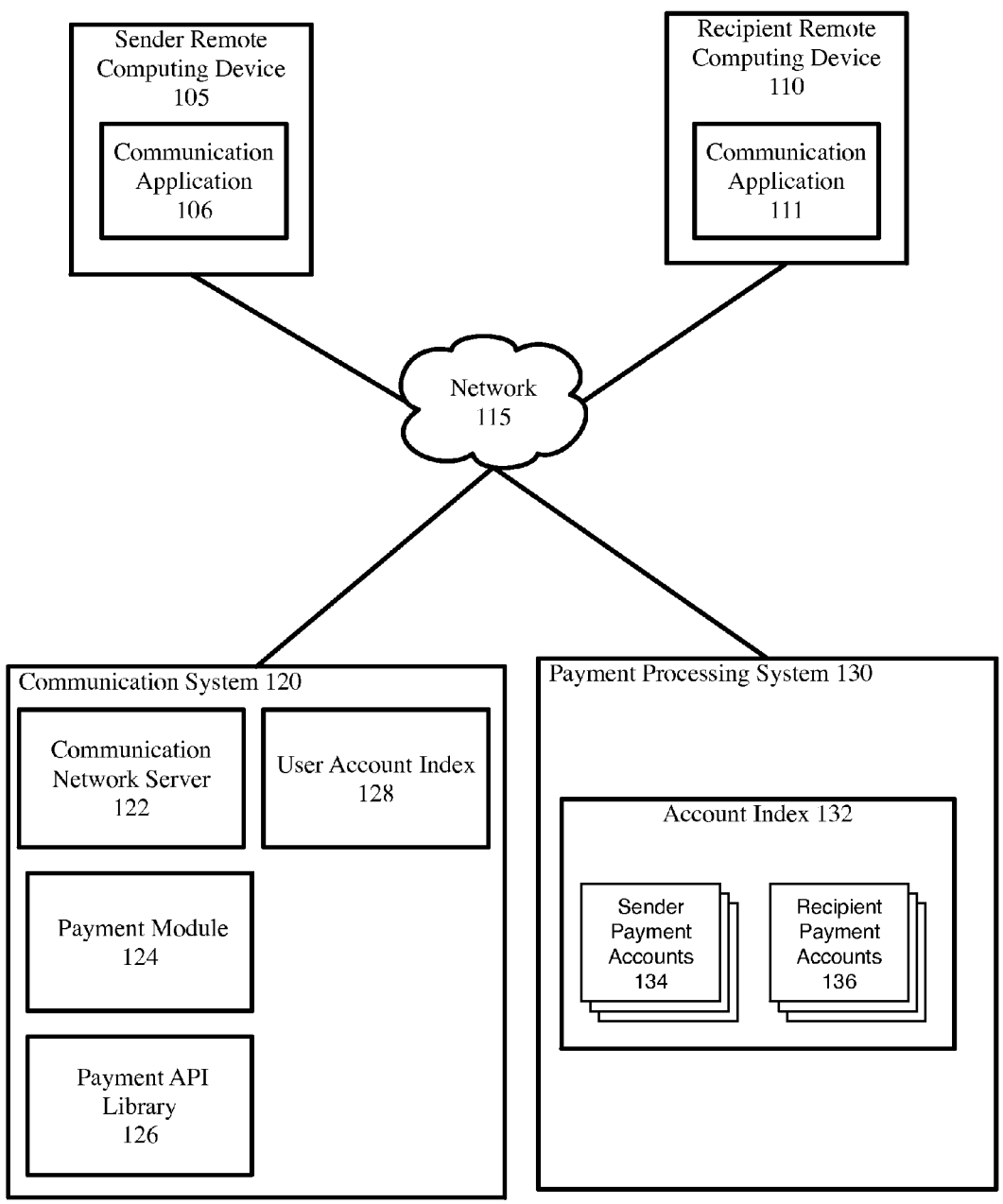
FIG. 1 is a block diagram depicting a system for sending electronic payments via communication systems, in accordance with certain example embodiments.

The methods and systems described herein enable users to make payments over an internet communication network. Example internet communication systems include audio conferencing systems, video conferencing systems, voice over internet protocol (VOIP) systems, instant messaging systems, social network system, and various synchronous communication systems. In certain example embodiments, an internet communication system may include a combination of VOIP, audio conferencing, video conferencing, instant messaging, and social network communications. In certain example embodiments, internet communication systems do not include e-mail systems. The embodiments described herein provide a user interface that allows a sender to initiate a payment directly from a communication application executing on a remote client computing device while engaging in a communication session on one or more of the above internet communication systems. In some embodiments, a payment application program interface library (API) allows the payment system of the present disclosure to communicate with sender and recipient applications during a communication session, detect a payment signal from the sender recipient communication application, and display a payment object in the sender communication application to collect payment transaction information from the sender. In some embodiments, the techniques described herein are integrated with the communication applications. In various embodiments of the techniques described herein, users may need to install a particular application and/or add-on module, and/or select a service for operation in order to obtain the benefits of the techniques described herein.

In one example embodiment, a sender initiates a payment over an internet communication system by selecting a payment option user interface displayed in the sender communication application. In certain other example embodiments, the sender may signal their intent to initiate a payment through one or more textual, audio, or visual signals. For example, a payment signal may comprise typing a textual signal such as a "$" or "I owe you" in a text-based communication, or through an audio command such as "send payment." In certain example embodiments, the payment signal may comprise obtaining an image capture of a currency bank note, such as a United States five-dollar bill. The system detects the payment signal and loads a payment object for display in the sender communication application. The payment object comprises a set of fields for collecting payment details from the sender. The sender enters the payment details in the payment object. In certain example embodiments, the recipient of the payment is automatically determined based on with whom the sender is communicating in a current communication session. In certain example embodiments, the payment amount is automatically determined by the image capture of a currency banknote, where the value of the currency banknote equals the payment amount.

The payment transaction details collected by the payment object are communicated by the API to the payment system. The payment system communicates the payment transaction details to a payment processing system. In certain example embodiments, the payment processing system may be an electronic wallet system, and the sender and recipient identifiers are the sender and recipient electronic wallet account identifiers. In certain example embodiments, the payment system may first request verification from the payment processing system that sufficient funds are available in the sender's payment account. If sufficient funds are not available, the payment system will display a notification to the sender in the sender communication application and provide the sender an option to modify their electronic account settings. For example, a sender may be able to select a different payment instrument, such as a different credit card, to continue processing the payment, or the sender may transfer additional funds into their electronic payment account. In certain other example embodiments, the payment system may display a security challenge in the sender communication application, requesting verification of the sender's identity before proceeding with the payment transaction. In certain other example embodiments, the payment system may display a payment notification object in each recipient communication application. The notification may request an acceptance notification from the recipient before proceeding with processing of the payment. Once the payment transaction information is accepted, the payment processing system transfers the indicated payment amount from the sender electronic payment account to the recipient payment account. The payment system then displays a payment confirmation in the sender and recipient communication applications or sends a confirmation to the sender and recipient through a separate communication channel, such as e-mail or text message. The payment system may also log a transaction summary of the payment transaction in a payment log or communication log of the internet communication system.

In another example aspect, a sender initiates a payment transaction while accessing a social network. The sender may initiate a payment when accessing a recipient identity page by selecting a payment object link displayed on the recipient identity page. A payment object is displayed, payment transaction information is collected, and processing of the payment proceeds substantially as described in the example embodiment above. Likewise, the recipient may receive a payment notification and be given the option to accept or decline the payment. In certain example embodiments, a payment confirmation is posted on the recipient identity page, the sender identity page, or both.

Turning now to the drawings, in which like numerals represent like (but not necessarily identical) elements throughout the figures, example embodiments are described in detail more detail.

Example System Architectures

FIG. 1 is a block diagram depicting a system for sending electronic payments via communication systems, in accordance with certain example embodiments. As depicted in FIG. 1, the system 100 includes network devices 105, 110, 120, and 130 that are configured to communicate with one another via one or more networks 115.

Each network 115 includes a wired or wireless telecommunication means by which network devices (including devices 105, 110, 120, and 130) can exchange data. For example, each network 115 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 105, 110, 120, and 130 includes a device having a communication application 106 and 111 capable of transmitting and receiving data over the network 115. For example, each network device 105, 110, 120, and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 105, 110 are operated by end-users or consumers (not depicted). The network devices 120, 130 are operated by communication system operators (not depicted) and payment processing operators (not depicted), respectively.

An end-user can use a communication application 106 and 111, such as a web browser application or a stand-alone application, to view, download, upload, or otherwise access documents or web pages via a distributed network 115. The network 115 includes a wired or wireless telecommunication system or device by which network devices (including devices 110, 135 and 140) can exchange data. The communication applications 106 and 111 can interact with web servers or other computing devices connected to the network 115, including communication system 120 and payment processing system 130.

It will be appreciated that the network connections shown are by way of example and other means of establishing a communications link between the computers and devices can be used. Moreover, those having ordinary skill in the art and having the benefit of the present disclosure will appreciate that the sender and recipient remote computing devices 105, 110, communication system 120, and payment processing system 130 illustrated in FIG. 1 can have any of several other suitable computer system configurations. For example, a sender remote computing device 105 embodied as a mobile phone or handheld computer may not include all the components described above and/or may include other components.

Example Processes

The components of the example operating environment 100 are described in more detail hereinafter with reference to the example methods illustrated in FIGS. 2-5. The example methods of FIGS. 2-5 may also be performed with other systems and in other environments.

FIG. 2 is a block flow diagram depicting a method 200 to send electronic payments via communication systems, in accordance with certain example embodiments.

Method 200 begins with block 205, where a sender remote computing device 105 initiates a synchronous communication session with one or more recipient remote computing devices 110 via the communication system 120. In some embodiments, the user associated with a particular device must install an application and/or make a feature selection to obtain the benefits of the techniques described herein.

A synchronous communication session enables same time communication and collaboration between different remote computing devices in different geographical locations. Example synchronous communication sessions include, but are not limited to, audio conferencing, web conferencing, video conferencing, chat rooms, instant messaging, and application or screen sharing. In certain example embodiments, a synchronous communication session conducted via the communication system 120 may involve two or more of the above types of synchronous communication. For example, a video conferencing session may be a web-based conferencing session that also includes application or screen sharing functions. A communication channel is established between the sender and recipient remote computing devices 105, 110 via the communication network server 122 of the communication system 120.

At block 210, the payment module 124 detects a payment signal reflecting a sender's intent to send a payment via the communication system 120 during a synchronous communication session, the sender being associated with a sender remote computing device 105. The payment module 124 may detect the sender's intent via the sender's interaction with a payment object displayed in the communication application 106, or by detection of a text-based payment signal, an audio-based payment signal, or an image-based detection signal.

Regarding payment signals detected from a sender's interaction with a user interface displayed in the communication application 106, a payment API library 126 may be installed on the sender and recipient remote computing devices 105, 110. The payment API library 126 comprises computer-executable code instructions that allows the communication application 106 on the sender and recipient remote computing devices 105 and 110 to communicate with the payment module 124 on the communication system 120. When a synchronous communication session is initiated using the communication application 106 on the sender remote computing device 105, a payment object is displayed to the sender by the communication application 106. The payment API library 126 allows a payment interface object, such as a button, to be displayed in the user interface of the communication application 106. When the sender selects the payment interface object, the payment API library 126 communicates the selection to the payment module 124.

Regarding detection of audio and text-based payment signals, the payment module 124 may monitor the communication session directly for such payment signals. For example, the payment module 124 may monitor an audio-based communication session for the verbal command "send payment." Alternatively, the payment module 124 may monitor the communication for a text-based payment signal such as "$" or "send payment." Accordingly, in such embodiments detection of the payment signal may not require detection by an API library executing on the sender remote computing device 105. In certain example embodiments, the audio and text-based payment signal monitoring of communication sessions may be disabled by the users of the communication session 120.

Regarding detection of an imaged-based payment signal, the payment module 124 may monitor the communication session directly for the image-based payment signal. For example, the payment monitor module 124 may monitor the communication session for transmission of an image of a currency banknote, such as a United States dollar bill. In certain example embodiments, the user may first select a payment object interface as described above and then be provided with the option to take a picture using a camera associated with the sender remote computing device 105 of a currency banknote to designate the payment amount they wish to send. The payment API library 126 recognizes the currency value based on the captured image and will communicate the currency value to the payment module 124.

At block 215, the payment module 124 collects sender payment information. Block 215 is described in further detail hereinafter with reference to FIG. 3.

Figure 3:
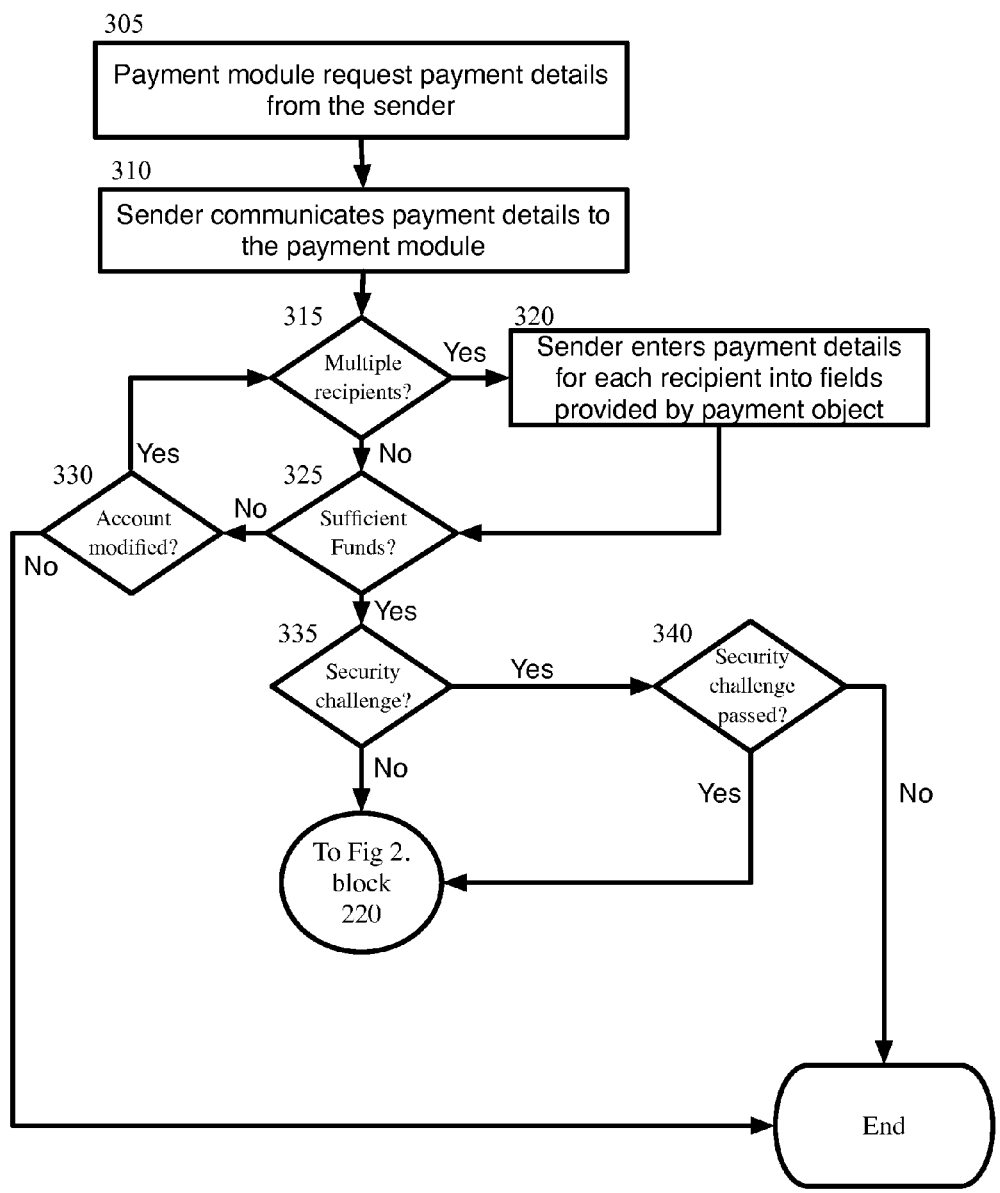
FIG. 3 is a block flow diagram depicting a method to collect payment transaction information from the sender, in accordance with certain example embodiments.

FIG. 3 is a block for diagram depicting a method 215 for collecting sender payment information, in accordance with certain example embodiments. The method 215 is described with reference to the components illustrated in FIG. 1.

Method 215 begins at block 305, where the payment module 124 request payment transaction details from the sender. Payment transaction details include at least a sender payment account identifier, one or more recipient identifiers, and a payment amount. In certain example embodiments, all other participants in the communication session are designated as recipients. Where the image-based payment signal is an image capture of a currency banknote, the payment amount is automatically set to the value of the currency banknote. In certain example embodiments, the payment module 124 may collect the payment transaction details by communicating a series of audio prompts to the sender remote computing device 105 and recording the sender's response using standard voice recognition methods or by receiving data input by the sender using a hard keypad on the remote computing device 105 or a soft keypad displayed within the communication application 106. In other example embodiments, a payment information object interface is displayed in the communication application 106 via the payment API library 126. The payment information object comprises fields where the sender may enter the requested payment information, or modify pre-populated fields such as designated recipients and payment amount.

At block 310 the payment module 124 receives the payment transaction details from the sender remote computing device 105. If the synchronous communication comprises an audio component and the payment transactions details are collected by audible responses to audio prompts from the payment module 124, the payment module 124 may establish a separate communication session and mute the primary communication session so the sender may privately provide payment information.

At block 315, the payment module 124 determines if the sender has indicated multiple recipients for the payment based on information entered in the payment information received in reference to block 305 above. If there are multiple recipients, the method proceeds to block 320.

At block 320, the payment module 124 confirms a payment amount has been designated for each recipient. For example, the payment module 124 may present a multi-recipient payment detail object via the communication application 106 to the sender listing each recipient and providing a field to indicate the payment amount for each recipient. In certain example embodiments, the payment module 124 may list the same payment amount for each recipient in the multi-recipient modal by default. The sender, may then edit the payment amounts and add or remove recipients as needed in the multi-recipient payment details object and communicate those edits to the payment module 124 by selecting a submit user-interface object displayed on the multi-recipient payment details object. The method then proceeds to block 325.

Returning to block 315, if the payment module 124 determines there is only a single recipient, the method proceeds directly to block 325.

At block 325, the payment module 124 communicates the payment details to the payment processing system 130 and requests a payment account status. The payment processing system 130 comprises an account index 132. The account index 132 comprises sender 134 and recipient 136 payment accounts (or records) associated with information such as user account identifier and payment account information, such as credit card account information.

Where the payment information object indicates multiple payment recipients, the payment module 124 may communicate payment details to the payment processing system 130 for each recipient separately. The payment processing system 130 uses the sender payment account identifier to access the sender payment account 134 and verify there are sufficient funds associated with the selected payment instrument for each requested payment. If the payment account status response from the payment processing system 130 indicates there are not sufficient funds to cover the payment amount indicated in the payment details the method proceeds to block 330.

At block 330, the payment module 124 displays a modify account object to the sender through the communication application 106 or provides a series of audio prompts regarding the need to update or modify the sender's payment account information. For example, the payment module 124 may display a modify account object interface that indicates the deficiency of funds and presents the sender with the option of modifying the payment details or canceling the payment transaction. If the sender elects to modify the account, the method returns to block 315 and steps 315 to 325 are repeated. The sender may modify the sender payment account 134, for example, by selecting a different payment instrument, or accessing the sender payment account 134 and authorizing the transfer of additional funds into the payment account, or by updating payment information associated with the sender payment account 134. If the sender elects to cancel the payment transaction, the method terminates. The communication session may continue as needed.

Returning to block 325, if the payment module 124 receives confirmation from the payment processing system 130 that there are sufficient funds available the method proceeds directly to block 335.

At block 335, the payment module 124 determines if a security challenge is needed before allowing the payment transaction to be completed. For example, the payment module 124 may determine if a security challenge is needed based on the payment amount, the amount of payment instrument information stored in the sender payment account 134, whether the payment is being made to someone within the sender's social network, or a combination thereof. The security challenge may require new payment account information such as full billing address, or the confirmation of known details such as the credit card number of the selected payment instrument. In certain other example embodiments, the security challenge may also require the sender to prove they are in possession of a validation code. For example, the payment module 124 may send a text message containing a validation code to a cell phone number associated with the sender's payment account. If the payment module 124 determines a security challenge is required the process proceeds to block 340.

At block 340, the payment module 124 displays a security challenge object to the sender via the communication application 106, or provides a security challenge audio prompt, and determines if the security challenge has been passed based on the information received from the sender. If the security challenge is passed the method proceeds to block 220 of FIG. 2. If the security challenge fails, the method terminates. In certain example embodiments, the sender may be given a limited number of additional attempts to provide the correct security challenge verification information before the payment process terminates. If the payment process terminates, the communication session may continue as needed.

Returning to block 335, if the payment module 124 determines a security challenge is not required the method proceeds directly to block 220 of FIG. 2. The payment module 124 may determine a security challenge is not required based on factors such as, the payment amount, the length of time from the last login or use of the system, or the amount of account information stored in the sender's payment account.

Returning to FIG. 2 at block 220, where the payment module 124 communicates a final payment request comprising the payment transaction details to the payment processing system 130. In certain example embodiments, the payment module 124 may first communicate an acceptance notification to the recipient or recipient remote computing device 110, the communication notification including an option to accept or reject the payment, before communicating the final payment request to the payment processing system 130. If the payment module 124 receives an acceptance notification from the recipient remote computing device 110, the payment module 124 communicates the final payment request to the payment processing device 124. If the payment module 124 receives a rejection notification from the recipient remote computing device 110, then the payment process terminates. The communication session may continue as needed. In certain example embodiments, if multiple recipients are designated and only a portion of the recipients accept the payment, the payment module 124 will first update the final payment request to remove the payment transaction details relating to the recipients that declined the payment before communicating the final payment request to the payment processing system 130.

At block 225, the payment processing system 130 processes the payment request. The payment processing system 130 accesses the sender payment account 134 based on the sender payment account identifier included in the payment request. If a recipient payment account 136 identifier was included in the payment request the payment processing system 130 uses that identifier to access the recipient payment account(s) 136. If a recipient payment account identifier was not included, or the recipient does not have a payment account registered with the payment processing system 130, the payment processing system 130 may communicate a registration request to the recipient. The registration request may be sent directly to the recipient, for example, by email if an email address for the recipient was included in the payment request, or through any other suitable mode of communication. Alternatively, the payment processing system 130 may communicate the registration request to the payment module 124. The payment module 124 will then display a registration request object in the recipient communication application 111 or provide a series of audio prompts directing the recipient on how to register for a payment account with the payment processing system 130. Once the payment processing payment system 130 has both a sender and recipient payment account identifier, the payment processing system 130 processes the payment and transfers the designated payment amount from the sender payment account 134 to the recipient payment account 136.

At block 230, the payment module 124 receives a payment confirmation from the payment processing system 130 that the payment has been completed.

At block 235, the payment module 124 may record a payment transaction record in a payment transaction logged stored in the communication system 120. The payment transaction log may be accessed by users of the communication system 120 to reference previous payments made during previous communication sessions. The payment module 124 may assign a transaction identifier to each record to facilitate searching past transactions, or may identify past transaction in the transaction log by sender or recipient identifier.

At block 240, the payment module 124 communicates a payment confirmation to the recipient and sender. The payment module 124 may display a confirmation object in the communication applications 106 and 111 of the recipient and sender respectively, or may communicate the payment confirmation via a separate communication mode, such as by text message or email to the sender and recipient.

Figure 4:
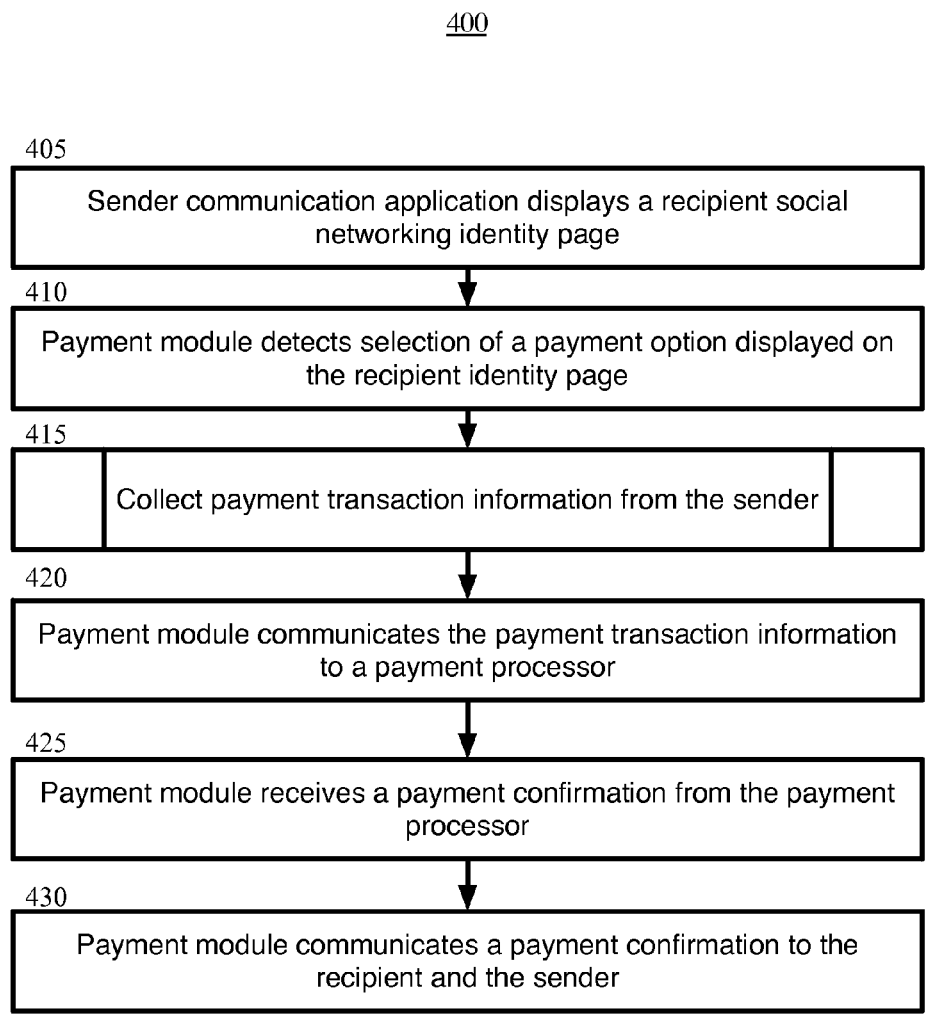
FIG. 4 is a block flow diagram depicting a method to send electronic payments via communication systems, in accordance with certain example embodiments.

FIG. 4 is a block flow diagram depicting a method 400 to send electronic payments via social networking identity pages, in accordance with certain alternative example embodiments.

Method 400 begins with block 405 where a sender communication application 106 displays a recipient social networking identity page when a sender associated with the sender communication application 106 accesses the recipient's identity page. A social networking identity page is associated with a recipient's social network account stored in a user account index 128. The payment API library 126 displays a payment object interface on the recipient's social networking page. In certain example embodiments, the payment API 126 may first reference the recipient's social networking account to determine if the recipient has enabled social networking payments and has registered the necessary electronic payment account information, such as a payment account identifier, before displaying the payment object interface on the recipient's identity page. In certain example embodiments, the payment API 126 may display a request payment access object that allows a sender to notify the recipient they wish to be able to send electronic payments from the recipient's identity page. Upon selection of this request payment access object, the payment API library 126 will notify the recipient and prompt them to enable social networking payments and register for, or provide existing electronic payment account information.

At block 410, the payment API library 126 communicates a notification to the payment module 124 in response to a sender selecting the payment object interface displayed on the recipient's identity page thereby indicating the sender's intent to send a payment via the communication system 120.

At block 415, the payment module 124 collects the sender's payment transaction details. The method 415 is described in further detail hereinafter with reference to FIG. 5.

Figure 5:
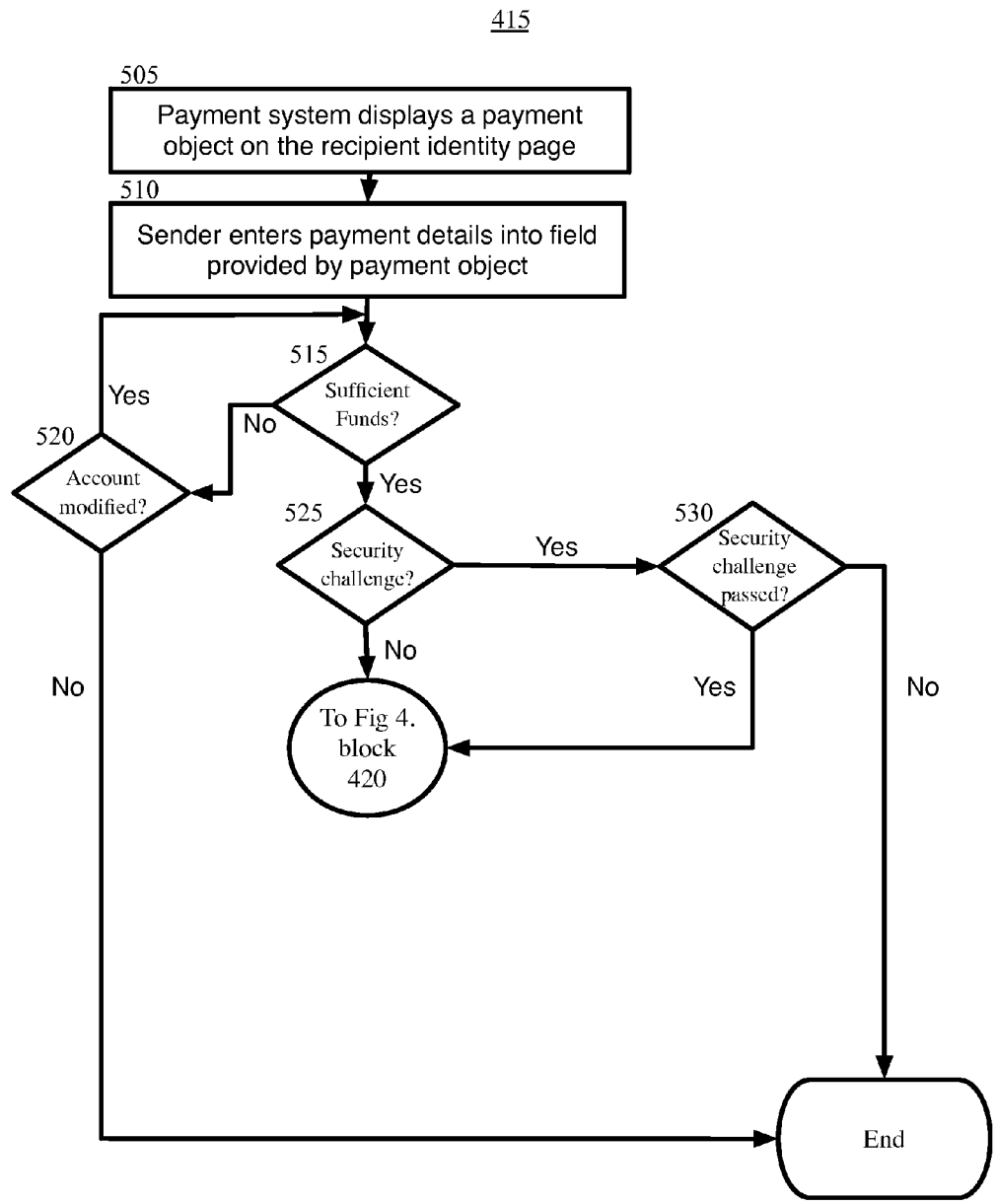
FIG. 5 is a block flow diagram depicting a method to collect payment transaction information from the sender, in accordance with certain example embodiments.

FIG. 5 is a block diagram depicting a method 415 for collecting sender payment transaction details, in accordance with certain example embodiments. The method 210 is described with reference to the components illustrated in FIG. 1.

Method 415 begins at block 505. Blocks 505 and 510 proceed substantially as described above regarding blocks 305 and 310 of FIG. 3, and blocks 515 to 530 proceed substantially as described above regarding blocks 325 to 340 of FIG. 3.

Returning to FIG. 4 at block 420, where the payment module 124 communicates the payment transaction details to the payment processing system 130. Blocks 420 through 430 then proceed substantially as described above regarding blocks 220 and 230 and FIG. 2. In certain example embodiments, the payment module 124 may communicate a record of the payment via the payment API library 126 for display on the identity page of the sender, recipient, or both. The record may indicate only that a payment was made or provide more information such as payment amount and a memo on what the payment was for.

In certain example embodiments, a user may request a payment, as well as send a payment. A user initiates a request by selecting the payment object on the requested identity page and indicating at least the requested amount. A payment request notification may be sent to the requestee indicating the requestor's identity and the requested payment amount. If the requestee accepts the payment request, the requestee becomes the sender and the requestor becomes the recipient, and the payment process proceeds as described above regarding blocks 405 to 430 above.

Other Example Embodiments

Figure 6:
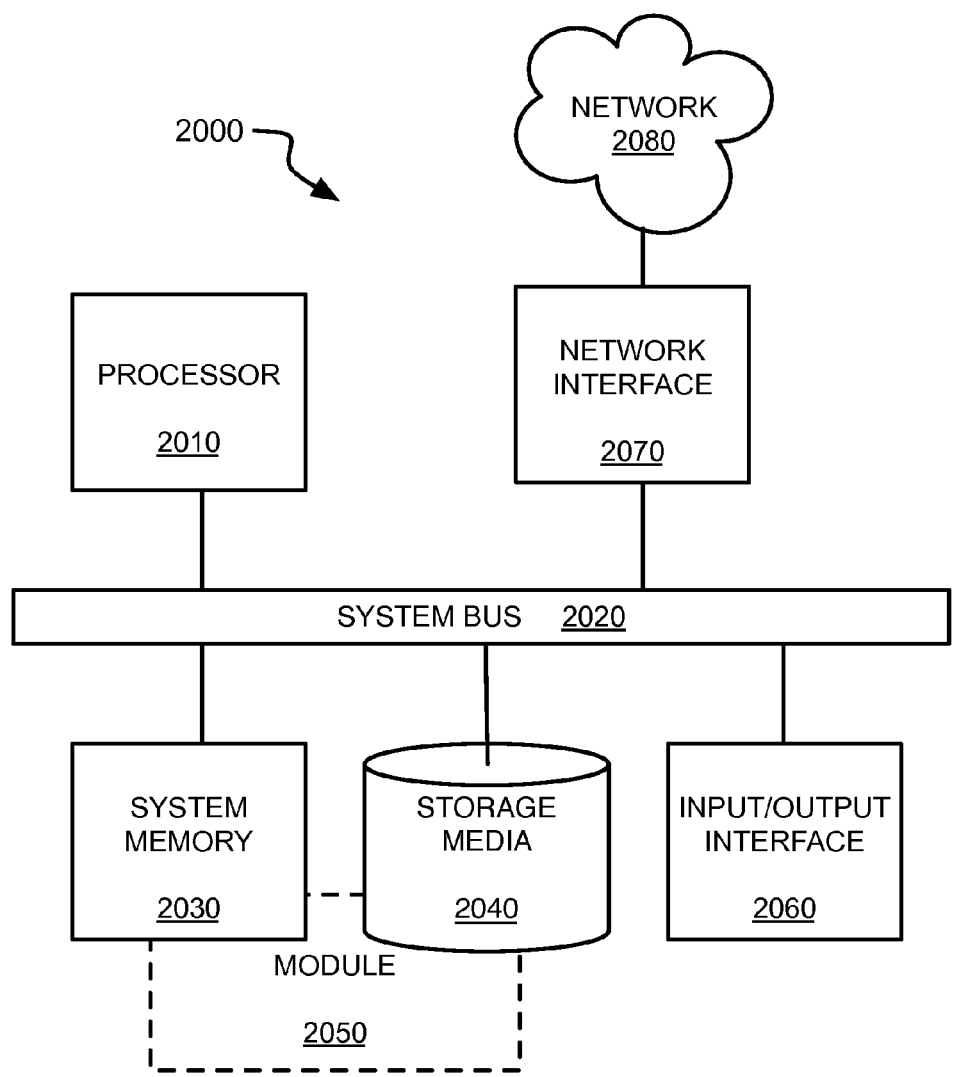
FIG. 6 is a block diagram depicting a computing machine and a module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to detect a signal and thereby send electronic payments via communication systems, comprising:

initiating, by one or more programmed computing devices, a voice or video communication session over one or more communication channels between two or more remote client computing devices, each remote client computing device comprising a voice or video communication application that transmits and receives communications over the communication channels during the voice or video communication session, each remote client computing device being associated with a participant in the voice or video communication session;

detecting, by the one or more programmed computing devices, a payment option signal initiated during the voice or video communication session directly from the voice or video communication application on a sender remote client computing device indicating that the participant associated with the sender remote client computing device intends to send a payment to one or more recipient participants each associated with another respective remote client computing device;

in response to detecting the payment option signal, instructing, by the one or more programmed computing devices, the voice or video communication application from which the payment optional signal was detected to display a payment object in the voice or video communication application of the sender remote client computing device, the payment object indicating one or more potential recipients based on the participants in the voice or video communication session and comprising fields to receive an input of and a payment amount for each of the one or more recipient participants;

receiving, by the one or more programmed computing devices, payment transaction information from the voice or video communication application of the sender remote client computing device, the payment transaction information comprising the payment amount for each of the one or more recipient participants input into the payment object displayed in the voice or video communication application of the sender remote client computing device;

processing, by the one or more programmed computing devices, the payment transaction information concurrent with the voice or video communication session; and communicating, by the one or more programmed computing devices, a payment confirmation of the processed payment transaction information to the voice or video communication application of the sender remote client computing device and the respective recipient remote client computing devices associated with the one or more recipient participants for which the payment amount was included in the payment transaction information.

2. The method of claim 1, further comprising:

providing for display, by the one or more programmed computing devices, a payment confirmation interface object in the voice or video communication application of the one or more recipient remote client computing devices, the payment confirmation interface object comprising a sender identifier, the payment amount, and a request for payment acceptance from the recipient participant of the respective recipient remote client computing devices; and receiving, by the one or more programmed computing devices, an acceptance notification from the voice or video communication application from the one or more recipient remote client computing devices, wherein processing the payment transaction information is only completed for the one or more recipient participants from which the acceptance notification is received.

3. The method of claim 1, wherein the payment option signal is a selection of a payment option object displayed within the voice or video communication application of the sender remote client computing device, a detection of a text-based payment signal, a detection of an audio-based payment signal, or a detection of an image-based payment signal.

4. The method of claim 1, wherein detecting the payment option signal comprises detecting an image capture of a currency banknote during the voice or video communication session.

5. The method of claim 4, wherein the currency banknote indicates the payment amount, and the indicated payment amount is automatically inserted into a payment amount field of the payment object.

6. The method of claim 1, wherein the voice or video communication application is a voice over internet protocol (VOIP) application, an audio conferencing application, or a video conferencing application.

7. A computer program product, comprising:

a non-transitory computer-readable medium having computer-readable program instructions embodied thereon that when executed by a computer cause the computer to detect a signal and thereby send electronic payments via communication systems, the computer-executable program instructions comprising:

computer-executable program instructions to initiate a voice or video communication session between two or more remote client computing devices, each remote client device comprising a voice or video communication application that transmits and receives communications during the voice or video communication session, and each remote client computing device is associated with a participant in the communication session;

computer-executable program instructions to detect a payment option signal from a voice or video communication application of a sender participant initiated during the voice or video communication session directly from the voice or video communication application on a sender remote client computing device indicating that the sender participant intends to send a payment to one or more recipient participants each associated with another respective remote client computing device;

computer-executable program instructions to display a payment object in the voice or video communication application of the sender remote client computing device during the communication session, the payment object comprising fields to receive input of payment transaction information, the payment transaction information comprising a sender payment account identifier, a recipient identifier, and a payment amount;

computer-executable program instructions to communicate the payment transaction information received at the payment object interface to a payment processing system for settling the payment between the sender participant and the recipient participant;

computer-executable program instructions to receive a payment confirmation from the payment processing system, the payment confirmation confirming the settling of the payment amount between the sender participant and the recipient participant; and computer-executable program instructions to communicate the payment confirmation of the processed payment transaction information to the voice or video communication application of the sender remote client computing device and the one or more recipient participants for which the payment amount was included in the payment transaction information.

8. The method of claim 7, further comprising:

computer-executable program instructions to provide for display a confirmation payment interface object in the voice or video communication application of the one or more recipient remote client computing devices, the confirmation payment interface object comprising a sender identifier, the payment amount, and a request for payment acceptance from the recipient participant of the respective recipient remote client computer devices; and computer-executable program instruction to receive an acceptance notification from the voice or video communication application of the one or more recipient remote client computing devices, wherein communicating the payment information to a payment processing system is only completed to the one or more recipient participants from which the acceptance notification is received.

9. The method of claim 7, wherein the payment option signal is a selection of a payment option object displayed within the voice or video communication application of the sender remote client computing device, a detection of a text-based payment signal, a detection of an audio-based payment signal, or a detection of an image-based payment signal.

10. The method of claim 7, wherein detecting the payment option signal comprises detecting an image capture of a currency banknote during the voice or video communication session.

11. The method of claim 10, wherein the currency banknote indicates the payment amount and the indicated payment amount is automatically inserted into a payment amount field of the payment object.

12. The method of claim 7, wherein the voice or video communication application is a voice over internet protocol (VOIP) application, an audio conferencing application, or a video conferencing application.

13. A system for detecting a signal and thereby sending electronic payments via communication systems, comprising:
a storage device; and
a processor communicatively coupled to the storage device, wherein the processor executes application code instructions that are stored in the storage device to cause the system to:
initiate a voice or video communication session between two or more remote client computing devices, each remote client computing device comprising a voice or video communication application that transmits and receives communications during the voice or video communication session, each remote client computing device is associated with a participant in the voice or video communication session;
detect a payment option signal during the voice or video communication session initiated from a voice or video communication application of a sender remote client computing device indicating that the participant associated with the sender remote client computing device intends to send a payment to one or more recipient participants each associated with another respective remote client computing device;
display a payment object in a voice or video communication application of the sender participant the payment object comprising fields to receive input of payment transaction information, the payment transaction information comprising a sender payment account identifier, a recipient identifier, and a payment amount;
communicate the payment transaction information received at the payment object to a payment processing system for settling the payment between the participant associated with the sender remote computing device and the one or more recipient participants each associated with another respective remote client computing device; and
receive a payment confirmation of the processed payment transaction information from the payment processing system, the payment confirmation confirming the settling of the payment amount between the participant associated with the sender remote computing device and the one or more recipient participants each associated with another respective remote client computing device.

14. The system of claim 13, further comprising computer-executable program instructions that cause the system to:
provide for display a confirmation payment interface object in the voice or video communication application of the respective remote client computing device associated with the one or more recipient participants, the confirmation payment interface object comprising a sender participant identifier, the payment amount, and a request for payment acceptance from the recipient; and
receive an acceptance notification from the voice or video communication applications of the one or more recipient participants, wherein communicating the payment information to a payment processing system is only completed for the one or more recipient participants from which the acceptance notification is received.

15. The system of claim 13, wherein the payment option signals is a selection of a user interface object displayed within the voice or video communication application on the sender participant, a detection of text-based payment signal, a detection of an audio-based payment signal, or a detection of an image-based payment signal.

16. The system of claim 13, wherein detecting the payment option signal comprises detecting an image capture of a currency banknote during the voice or video communication session.

17. The system of claim 16, wherein the currency banknote indicates the payment amount and the indicated payment amount is automatically inserted into a payment amount field of the payment object.

18. The system of claim 13, wherein the voice or video communication application is a voice over internet protocol (VOIP) application, an audio conferencing application, or a video conferencing application.

19. A computer-implemented method to detect a signal and thereby send electronic payments via communication systems, comprising:
initiating, by one or more programmed computing devices, a voice or video communication session between two or more remote client computing devices, each remote client computing device comprising a voice or video communication application that transmits and receives communications during the voice or video communication session, each remote client computing device being associated with a participant in the voice or video communication session;
detecting, by the one or more programmed computing devices, a payment option signal initiated during the voice or video communication session directly from the voice or video communication application on a sender remote client computing device indicating that the participant associated with the sender remote computing device intends to send a payment to one or more recipient participants each associated with another respective remote client computing device, wherein the payment option signal comprises an image capture of a currency banknote during the voice or video communication session;
displaying, by the one or more programmed computing devices, a payment object in the voice or video communication application of the sender remote computing device, the payment object comprising fields to receive an input of payment transaction information, the payment transaction information comprising a sender participant payment account identifier, one or more recipient participant identifiers, and a payment amount for each of the one or more recipient participants;
receiving, by the one or more programmed computing devices, the payment transaction information from the voice or video communication application of the sender remote computing device, the payment transaction information comprising the payment amount for each of the one or more recipient participants input into the payment object displayed in the voice or video communication application of the sender remote client computing device;

processing, by the one or more programmed computing devices, the payment transaction information concurrent with the voice or video communication session; and communicating, by the one or more programmed computing devices, a payment confirmation of the processed payment transaction information to the voice or video communication application of the sender remote computing device and the respective recipient remote client computing devices associated with the one or more recipient participants for which the payment amount was included in the payment transaction information.

20. The method of claim 19, wherein the currency banknote indicates the payment amount and the indicated payment amount is automatically inserted into a payment amount field of a payment object.

21. The method of claim 19, wherein the voice or video communication application is a voice over internet protocol (VOIP) application, an audio conferencing application, or a video conferencing application.

* * * * *